United States Patent
Land et al.

[11] 3,740,118
[45] June 19, 1973

[54] SELF STRAIN BIASED FERROELECTRICELECTROOPTICS

[75] Inventors: Cecil W. Land; Willis D. Smith, both of Albuquerque, N. Mex.

[73] Assignee: The United States of America as represented by the United States Atomic Energy Comission, Washington, D.C.

[22] Filed: Dec. 1, 1971

[21] Appl. No.: 203,726

[52] U.S. Cl. .................................. 350/150, 350/155
[51] Int. Cl. ................................................. G02f 1/26
[58] Field of Search .................. 350/147, 149, 150, 350/157, 160, 161; 340/173.2, 173 SS

[56] References Cited
UNITED STATES PATENTS

| | | | |
|---|---|---|---|
| 3,663,088 | 5/1972 | Maldonado et al. | 350/150 |
| 3,659,270 | 4/1972 | Maldonado et al. | 350/149 |
| 3,600,611 | 8/1971 | Treharne | 350/149 |
| 3,653,743 | 4/1972 | Kiefer et al. | 350/150 |
| 3,666,666 | 5/1972 | Haertling | 350/150 |
| 3,560,955 | 2/1971 | Hallman | 350/149 |

*Primary Examiner*—David Schonberg
*Assistant Examiner*—Michael J. Tokar
*Attorney*—Roland A. Anderson

[57] ABSTRACT

An electrooptic birefringent device and method of achieving birefringence including providing an electric field from one major surface to another of a ferroelectric ceramic plate which is capable of exhibiting electrically induced birefringence effects to electrically modify dimensions of said plate, rigidly fastening edge portions of the plate to a rigid structure, and thereafter modifying dimensions and birefringence of said plate by application of electric fields between the major surfaces of the plate.

10 Claims, 6 Drawing Figures

PATENTED JUN 19 1973 3,740,118

INVENTORS
CECIL E. LAND
WILLIS D. SMITH
BY

SELF STRAIN BIASED FERROELECTRICELECTROOPTICS

BACKGROUND OF INVENTION

Ordinarily, an optical quality, ferroelectric ceramic plate which is capable of electrically induced birefringence effects of the type described in U.S. Pat. No. 3,531,182 to Cecil E. Land and Donald G. Schueler for "Multi-Remanent Ferroelectric Ceramic Optical Device," is isotropic in the plane normal to the poling or switching direction. As a consequence, prior electrically induced birefringent ferroelectric ceramic devices generally used a transverse electrooptic mode, that is a switching of polarization levels, and consequently birefringent levels, in a direction parallel to the major surfaces of the ferroelectric ceramic plate and perpendicular to the direction of incident light, to provide the necessary anisotropy to indicate polarization changes by corresponding changes in birefringence. Devices have now been made in which there ferroelectric ceramic plates are physically strained in tension along an axis having a direction parallel with the major surfaces of the plate which results in a condition of uniaxial birefringence in the direction of strain. With such condition, the ferroelectric ceramic plate may then be poled in a direction perpendicular to the major surfaces thereof to different levels of polarization and reduce the birefringence from the initial birefringence level to a plurality of stable birefringence levels. In these prior devices, the desired strain was produced by bonding the ferroelectric ceramic plate over one entire major surface to a substrate and then bending the substrate about an axis perpendicular to the desired strain direction. These so bent, ferroelectric ceramic plates exhibited birefringence changes from one saturation remanent level to a zero remanent polarization level of about $3 \times 10^{-3}$. The provision of such strain biasing by this mechanism often produced non-uniform strains within the materials due to limitations in bonding techniques and other factors which adversely affects the optical properties of the devices and often resulted in light scattering and depolarization of light in the ferroelectric ceramic plate. In addition, the ferroelectric ceramic plate is subject to damage or destruction from these strains, especially as the plates are generally no greater than a few mils in thickness and very brittle in nature. Other strain biasing may be achieved in an arrangement described in copending application Ser. No. 203,723 (S-40,252) to Gene H. Haertling, Cecil E. Land and Ira D. McKinney for Strain Biased Ferroelectric Electrooptics, filed on the same day as this application.

Since the changes in birefringence are achieved by electrical fields produced between the major surfaces of the plate and in the same direction as incident light, the operation is termed a "longitudinal mode" type of operation. Such operation is desirable as it permits switching with relatively low amplitude voltages and permits controlling of large areas or apertures of material with the same low voltages. In addition, such large aperture switching may be achieved at relatively high speeds without increasing voltage.

SUMMARY OF INVENTION

In view of the above, it is an object of this invention to provide a new, strain-biased electrooptical device and method of achieving the same.

It is a further object of this invention to provide a strain-biased device which exhibits large variations in birefringence levels.

It is a still further object of this invention to provide a method of strain biasing of a ferroelectric ceramic plate which is both simple and reliable in operation.

Various other objects and advantages will appear from the following description of the invention and the most novel features will be particularly pointed out hereinafter in connection with the appended claims. It will be understood that various changes in the details, materials and arrangement parts, which are herein described and illustrated in order to explain the nature of the invention, may be made by those skilled in the art.

The invention comprises producing an electric field between the major surfaces of a ferroelectric ceramic plate capable of electrically induced birefringence effects to modify dimensions of said plate with bonding of parallel edges of the ferroelectric ceramic plate to a rigid supporting member and thereafter applying other electric fields in said same direction to vary the dimensions and birefringence of said plate.

DESCRIPTION OF DRAWING

The invention is illustrated in the accompanying drawings wherein.

DETAILED DESCRIPTION

Figure 1:
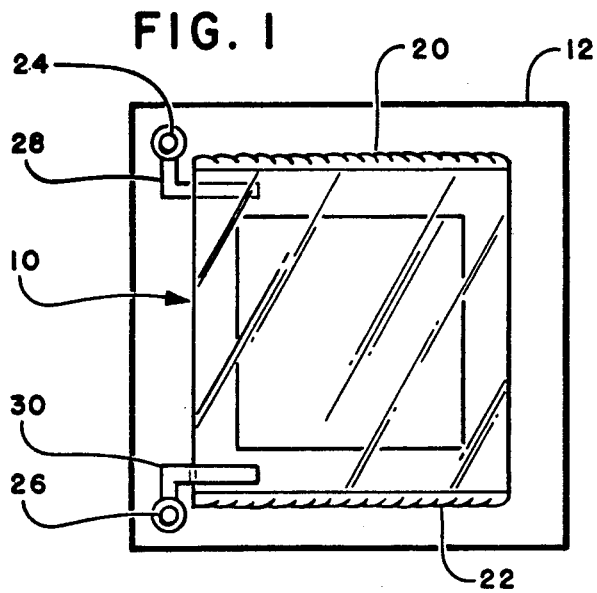
FIG. 1 is an elevation top view showing an embodiment of an electrooptic device constructed in accordance with this invention.
Figure 2:
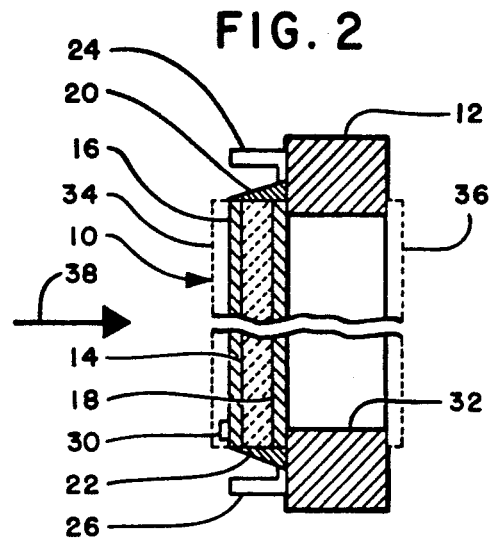
FIG. 2 is an expanded and segmented, cross sectioned side view of the device of FIG. 1.

The self-biased, longitudinal mode electrooptic system of this invention, as shown in FIGS. 1 and 2, includes a birefringent ferroelectric device 10 suitably bonded to a rigid substrate or supporting member 12. The ferroelectric device 10 is formed from a ferroelectric ceramic plate 14 of appropriate solid solution composition having transparent electrodes 16 and 18 on its major surfaces, the ferroelectric ceramic plate being subjected to a uniaxial tensile strain in a direction parallel to the major surfaces thereof in a manner described below.

Figure 3:
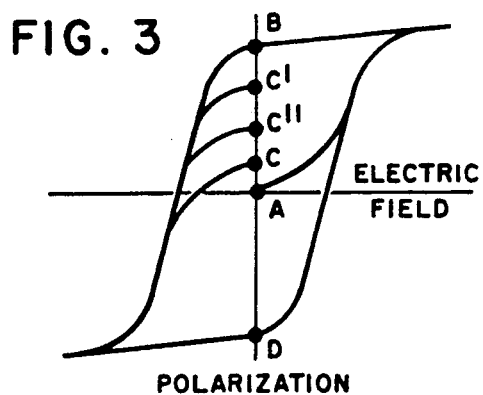
FIG. 3 illustrates a typical hysteresis loop curve for a ferroelectric ceramic material usable in the device of FIG. 1.

The plate 14 is made from a ferroelectric ceramic, mixed oxide or chemically prepared solid solution which has been formed by suitable hot-pressing and other techniques to be of optical quality internally and on its major surfaces. Plate 14 is shown as being generally rectangular or square and with generally parallel, oppositely disposed major surfaces, but can be of other configurations if desired. Typical materials and solid solution compositions of lead zirconate titante with various additives and substituents are described in copending application S.N. 885,789 by Gene H. Haertling for "Ferroelectric Ceramic Materials", filed Dec. 17, 1969 now U.S. Pat. No. 3,666,666 and the above-referred to U.S. Pat. No. 3,531,182. The desirable materials exhibit a polarization vs electric field hysteresis loop similar to that shown in FIG. 3 in which a thermally depoled element at point A of the curve, when subjected to a polarization field, will be polarized to a saturation polarization condition by appropriate electric field strengths. When the electric field is removed, the polarization will relax back to a saturation remanent polarization level B, where it will remain until polarized to a different level by an electric field of opposite polarity or until thermally depoled. When an opposite polarity field of appropriate amplitude and duration is applied to the material, the material may be polarized to different levels of polarization between the saturation remanent level B and electrical zero or near electrical zero remanent level C, such as at polarization remanent levels C' and C''. If the opposite polarity electric field is selected to have sufficient amplitude and duration, the ceramic may be polarized to negative saturation from which point it may relax to saturation remanent polarization level D upon removal of the field. These materials may be polarized, as described, by proper selection of amplitude, duration and polarity of electric field to the saturation remanent levels, near electrical zero level, and a plurality of intermediate remanent levels and the ceramic will remain at these levels until it is electrically switched to another level or thermally depoled. In addition to exhibiting these stable, remanent polarization characteristics, the desired ferro-electric ceramics also exhibit stable remanent strains in that the ferro-electric ceramic will expand or elongate in a direction parallel to the applied electric field while contracting in any remaining dimensions. Thus, when a voltage is applied between electrodes 16 and 18 of ferroelectric ceramic plate 14 with the plate in a free and unbonded condition before attachment to member 13, an electric field will be produced in the thickness direction, referred hereinafter as the longitudinal direction, and ferro-electric ceramic plate 14 will elongate or expand in the thickness dimension and contract or shrink in the length and width dimensions. Under these conditions, the ferroelectric ceramic plate 14 may be bonded along any two generally parallel edges or substantially parallel edge portions to supporting member 12 by appropriate bonding material or adhesive 20 and 22. After the bonding is complete, the electric field may be removed. Alternatively the plate 14 may be switched to a nonzero remanent state, the field removed and the plate then bonded to supporting member 12 in the same manner. Since the plate is firmly held in place or restrained from movement by bonds 20 and 22 and supporting member 12 along the two, generally parallel edge portions, and since the ferroelectric ceramic 14 will attempt to return to its original shape before application of the electric field in intermediate unrestrained portions, plate 14 will be subjected to a tensile strain in a direction parallel to the bonded edges direction and be self-strain biased and be optically anistropic in the plane of the major surfaces thereof.

The desired electric fields may be applied to ferroelectric plate 14 by applying a voltage between suitable terminals 24 and 26 and conductors 28 and 30 attached to or mounted on supporting member 12 and connected to appropriate electrodes 18 and 16, respectively, in a well known manner. The voltage may be applied to terminals 24 and 26 by connecting the same to a suitable voltage source (not shown) that is capable of providing the required voltage levels and durations.

The transparent conductive electrodes 16 and 18 preferably cover the entire surface of ferroelectric ceramic plate 14 on the major surfaces thereof so as to provide the desired self-strain biasing of the ceramic plate. The transparent electrodes may be made from such materials as indium oxide, indium-tin oxide, or thin gold. If it is desired a suitable photoconductive layer (not shown) may be sandwiched between the ferroelectric ceramic plate 14 and one of the electrodes, such as electrode 16, to provide selective addressing of different portions of the ferroelectric ceramic plate 14. The supporting member 12 may be made of any desired material with suitable dimensions and size so as to be substantially rigid with respect to electrically induced strains in ferroelectric ceramic plate 14 and may be made of such as lava, a metal like aluminum, plexiglass, and the like. If the supporting member 12 is made of an optically opaque or substantially optically opaque material such as lava or metal, a window 32 may be provided therethrough which communicates with a substantial portion of the area of ferroelectric ceramic plate 14 covered by the electrode 16 and 18.

Figure 4:
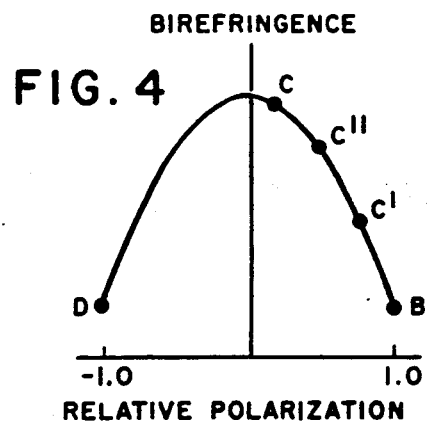
FIG. 4 illustrates, together with FIG. 3 a typical operating sequence of this invention by use of a relative polarization vs birefringence graph.

As the ferroelectric ceramic plate 14, bonded to supporting member 12 in the manner described above, is switched from one saturation remanence to the other through electrical zero, the plate expands and then contracts to its original dimensions after bonding. During expansion, plate 14 is constrained in the direction perpendicular to the bonded edges and the strain within plate 14 becomes essentially uniaxial in the direction parallel to the bonded edges. As this occurs, the ferroelectric ceramic plate, which was strained to produce the desired anistropy in the plane of the ceramic plate by the strain biasing (bonding operation), exhibits variations in birefringence with changes in polarization generally following the curve shown in FIG. 4, with levels correspondingly lettered with the respective remanent levels of FIG. 3. The change in birefringence from level B to level C may typically be about $1 \times 10^{-2}$ for PLZT 7/65/35. This change in birefringence from saturation remanence to zero or electrical zero remanence levels may vary from about 0 to $-1 \times 10^{-2}$. The change in birefringence may be observed or measured in plate 14 by appropriately positioning a polarizing plate or element 34 adjacent one side of device 10 and a second polarizer or analyzer 36 adjacent another side of device 10, as shown by the dotted lines in FIG. 2, while directing a beam of white or monochromatic light, indicated by the arrow 38, through the polarizer 34, device 10 analyzer 36 arrangement. Analyzer 36 is preferably positioned with its polarization angle at 90° with respect to the polarization angle of polarizer 34. It will be noted, that ferroelectric ceramic plate 14 may be polarized to the intermediate levels of polarization remanence represented by C' and C'' to provide correspondingly different variations in longitudinally viewed birefringence, as shown in FIG. 4. As the polarization levels are changed by appropriate voltage biases applied to terminals 24 and 26, different levels or amplitudes of light may be transmitted to the polarizer 34 device and an analyzer 36 arrangement, or even different colors when a white light source is used.

Ferroelectric ceramic plate 14 may also be self-strained biased by polarizing the ceramic plate while the device 10 is in the unbonded and free condition in the thickness direction as stated above, and then clamping device 10 with appropraite clamps or the like along two generally parallel edges to supporting member 12. At this point, the electric field may be removed and ferroelectric ceramic plate 14 electrically depoled or thermally depoled by heating above its Curie temperature so as to cause a uniaxial, preferential expansion or strain in the direction parallel to the clamped edges of device 10. The device 10 may then be bonded to supporting member 12 along the two edges perpendicular to this uniaxial strain and the clamps removed. Subsequent poling and switching of the ferroelectric plate 14 in the thickness direction will result in changes in birefringence viewed longitudinally as indicated by the curve shown in FIG. 5, which is correspondingly lettered with the hysteresis loop curve of FIG. 3. Such an arrangement and mode of operation provides an inversion of the birefringence vs relative polarization characteristics which may be desired for some applications.

Figure 6:
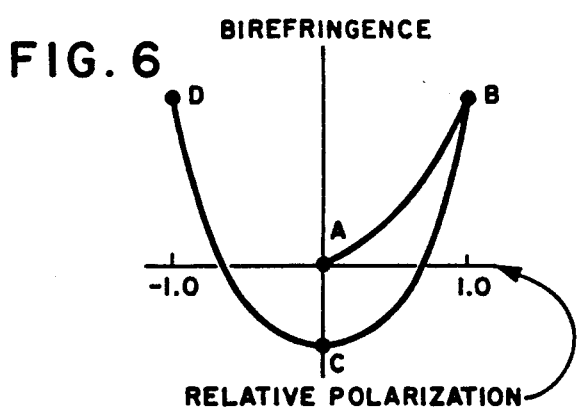
FIG. 6 is another relative polarization vs birefringence curve illustrating still another forming and operating sequence of the device of FIG. 1.

The device 10 may also be operated by first thermally or electrically depoling ferroelectric ceramic plate 14 while device 10 is in the unbonded state or condition and then bonding device 10 in this condition along two, generally parallel edges to supporting member 12. After bonding, when the ferroelectric ceramic plate 14 is polarized to respective polarization remanence levels in the thickness direction between electrodes 16 and 18 in the manner shown in FIG. 3, the birefringence viewed longitudinally through device 10 will vary as shown in FIG. 6, which is also correspondingly lettered with respect to FIG. 3. The mode of operation illustrated by FIG. 6 will provide a 90° rotation of the optic axis as the birefringence varies from negative to positive values.

Figure 5:
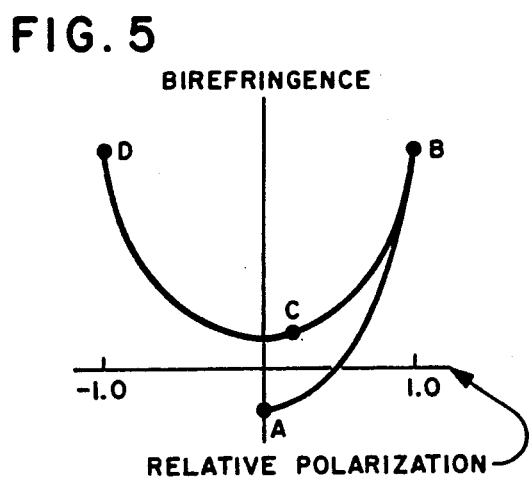
FIG. 5 is another relative polarization bs birefringence curve illustrating another method of forming and operating the device of FIG. 1.

With the system or arrangement shown in FIGS. 1 and 2, and any of the modes of operation described with respect to FIG. 4, 5 and 6, the ferroelectric electrooptic device may be used in electrooptic displays, electrooptic memories, large aperture shutters, light valves, polarization switches and spectral filters. The ferroelectric ceramic device may be fabricated and provided with the desired self-strain biasing with greatly simplified procedures and reduced cost and size than was known previously.

What is claimed is:

1. A method of providing a longitudinal mode electrooptic effect for varying birefringence in a ferroelectric ceramic plate having edge portions and oppositely disposed optical quality surfaces and which exhibits stable remanent strains, consisting of electrically inducing changes in dimension of said plate; restraining only oppositely disposed, spaced apart edge portions of said plate against any movement while simultaneously permitting movement of intermediate plate portions and remaining unrestrained edge portions of said plate concurrently with said dimension change, said unrestrained edge portions being adjacent and intermediate said restrained edge portions to apply an essentially uniaxial strain in said plate parallel to said restrained oppositely disposed edge portions during said movement; and thereafter applying an electric field through said plate perpendicular to said optical quality surfaces to vary birefringence in said plate.

2. The method of claim 1 wherein said inducing includes producing an electric field in said plate from one major surface to the other to effect said dimension changes and removing said inducing field subsequent to restraining of said opposite edge portions.

3. The method of claim 2 wherein said inducing field is removed prior to restraining of said opposite edge portions.

4. The method of claim 2 including, subsequent to said producing step and prior to said restraining step, clamping of said plate from movement in a direction perpendicular to said opposite edge portions, and thereafter removing said field and depoling said ferroelectric ceramic plate.

5. The method of claim 1 wherein said inducing includes depoling said ferroelectric ceramic plate.

6. An electrooptic device consisting of a rigid supporting member; a ferroelectric ceramic plate having edge portions and generally oppositely disposed optical quality surfaces, said ferroelectric ceramic being a solid solution exhibiting electrically induced birefringence effects and stable remanent strains; means for fixedly securing only oppositely disposed, spaced apart edge portions of said ferroelectric ceramic plate to said rigid member against any movement and for leaving unrestrained edge portions adjacent and intermediate said secured oppositely disposed edge portions, said unrestrained edge portions and other intermediate portions of said ferroelectric ceramic plate being free for movement to apply an essentially uniaxial strain in said plate parallel to said secured edge portions during said movement; first and second optically transparent electrodes, each disposed on one of said optical quality surfaces of said plate; and means for applying an electric field to said electrodes for effecting dimension changes in said plate resulting in said movement and birefringence changes in said plate.

7. The device of claim 6 wherein said ferroelectric ceramic plate is initially strained.

8. The device of claim 6 wherein said rigid member is substantially optically opaque and includes a passageway communicating and optically aligned with one of said electrodes.

9. The device of claim 6 wherein said first and second electrodes cover a substantial portion of said surfaces of said ferroelectric plate.

10. The device of claim 6 including means for supplying polarized light to one of said surfaces of said plate; and means for sensing changes in birefringence of said plate;

* * * * *

UNITED STATES PATENT OFFICE
CERTIFICATE OF CORRECTION

Patent No. 3,740,118   Dated June 19, 1973

Inventor(s) Cecil E. Land and Willis D. Smith

It is certified that error appears in the above-identified patent and that said Letters Patent are hereby corrected as shown below:

It is hereby certified that error appears in the above numbered patent requiring correction and that the said Letters Patent should read as corrected below.

Inventor(s): for "Cecil W. Land" read -- Cecil E. Land --.

Signed and sealed this 20th day of November 1973.

(SEAL)
Attest:

EDWARD M. FLETCHER, JR.   RENE D. TEGTMEYER
Attesting Officer   Acting Commissioner of Patents

FORM PO-1050 (10-69)